G. F. HUSSEY.
Coffee-Pot.

No. 212,801.          Patented Mar. 4, 1879.

Witnesses,
W. J. Cambridge
H. A. Manley.

Inventor,
George F. Hussey
by F. C. Teschemacher
Atty

UNITED STATES PATENT OFFICE.

GEORGE F. HUSSEY, OF BOSTON, MASSACHUSETTS.

IMPROVEMENT IN COFFEE-POTS.

Specification forming part of Letters Patent No. 212,801, dated March 4, 1879; application filed December 26, 1878.

*To all whom it may concern:*

Be it known that I, GEORGE F. HUSSEY, of Boston, in the county of Suffolk and State of Massachusetts, have invented certain Improvements in Coffee-Pots, of which the following is a full, clear, and exact description, reference being had to the accompanying drawings, making part of this specification, in which—

Figure 1:
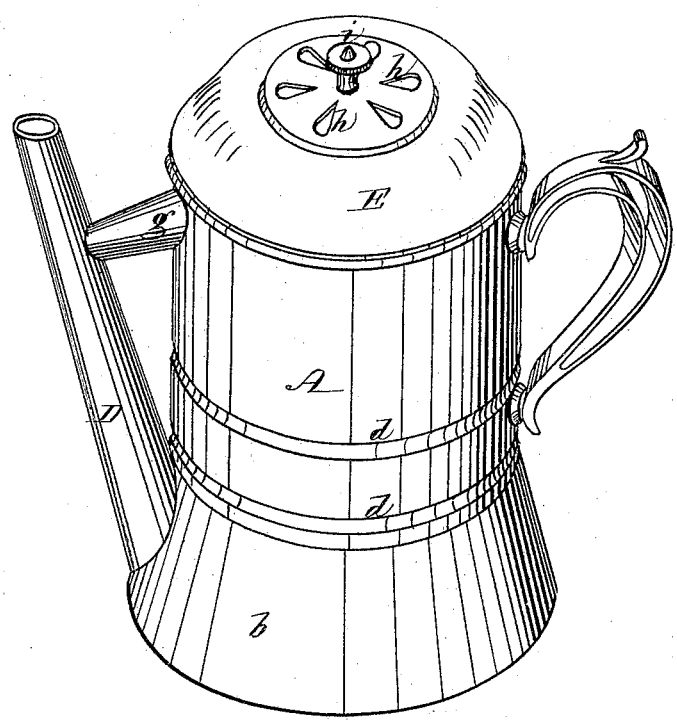
Figure 2:
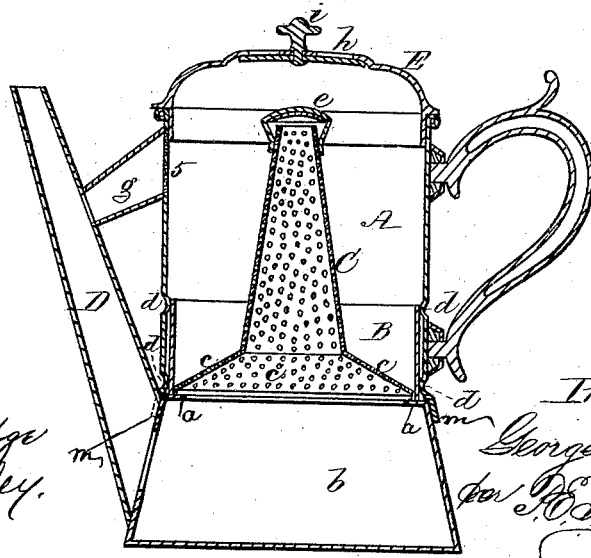

Figure 1 is a perspective view of a coffee-pot constructed in accordance with my invention. Fig. 2 is a vertical section through the center of the same.

In making table-beverages which contain a great amount of nutriment, such as those made from cereals, cracked cocoa, shells, &c., much trouble is experienced on account of the boiling over of the liquid, which runs onto the stove and creates an unpleasant odor.

My invention has for its object to effectually prevent this overflow; and consists of a coffee-pot provided with an enlarged bottom and a removable coffee-receptacle having a perforated funnel-shaped bottom located at or near the center of the pot, with a vertical tube projecting up from its center, through which the boiling water is forced up into the coffee-receptacle, by which construction and arrangement the liquid at the bottom of the pot, when boiling, is thrown toward its center without creating any perceptible disturbance in the spout, or causing the liquid or steam to escape therefrom, the upper portion of the spout being connected by a tube with the interior of the pot at or near its top, which allows the liquid to flow back through the spout into the bottom of the pot, when it is forced up through the vertical tube faster than it can return through the coffee and strainer beneath it; a perfect circulation being thus effected, and the process of making the coffee greatly accelerated.

My invention also consists of a novel method of forming on the interior of the pot a rest or ledge for supporting the coffee-receptacle.

To enable others skilled in the art to understand and use my invention, I will proceed to describe the manner in which I have carried it out.

In the said drawings, A represents the body of the coffee-pot, the lower portion, *b*, of which is enlarged or made in the shape of the frustum of a cone. Within the pot is snugly fitted a removable receptacle, B, which forms a chamber for containing the ground coffee, this receptacle being provided with a perforated bottom or strainer, *c*, and being held in position at or near the center of the pot by means of an inwardly-projecting ledge or flange, *a*, and the beads *d*, which form a packing to prevent the passage of the liquid between the exterior of the receptacle and the inside of the pot. The perforated bottom *c* of the coffee-receptacle is funnel-shaped, rising from its periphery toward the center, from which projects a perforated vertical tapering tube, C, open at the bottom and top, the latter being provided with a concavo-convex disk or deflector, *e*.

The ledge or flange *a* is formed by turning over the upper edge of the lower portion, *b*, as seen in Fig. 2, the lower edge of the upper portion, *m*, of the pot overlapping the edge of the lower portion, *b*, at the joint, which is soldered to make it tight, this method of forming the ledge *a* being simple and cheap, and avoiding the necessity of soldering a separate piece to the interior of the pot to form a rest for the receptacle.

The ground coffee having been placed in the receptacle B, and the required quantity of water introduced into the pot, the latter is placed upon the stove or over the fire to boil, and as soon as the water becomes heated the pressure of the steam causes it to be forced up the vertical tube C, through the perforations from the top of which, under the deflector *e*, it is discharged into the receptacle B and onto the coffee therein, through which and the perforated bottom *c* it returns to the bottom of the pot, to be again raised as before, a continuous and perfect circulation of the liquid being thus effected as long as it boils; and the leaching of the coffee is thus quickly effected as desired.

The form of the bottom *b* of the pot, in connection with the position of the receptacle B and the form of its perforated bottom, causes the liquid, when boiling, to be thrown toward the center of the pot without creating any perceptible commotion in the spout D, or causing the liquid or steam to escape therefrom.

The upper portion of the spout D is connected with the interior of the pot near its top by a short tube, $g$, the mouth of which is covered by a strainer, 5, which affords a means of escape for the liquid into the spout D, and thence down into the bottom of the pot, in case it should boil so briskly as to be forced up and discharged from the tube C faster than it can return through the coffee and strainer $c$, thus avoiding overflow, and affording an additional means of circulation.

The cover E of the pot is provided with a register or valve, $h$, which can be opened or closed by turning the knob $i$, and by means of this valve air can be admitted for the purpose of checking excessive boiling and foaming, and thus still further avoiding the liability of overflow or escape of the liquid at the joint of the cover.

I am aware that a coffee-pot has been constructed with a coffee-receptacle having a perforated bottom and a vertical tube through which the liquid is forced up into the coffee-receptacle, returning through the ground coffee therein to the bottom of the pot, to be again raised, thus establishing a circulation of the liquid. To this I lay no claim; but

What I claim as my invention, and desire to secure by Letters Patent, is—

1. The combination and arrangement of the pot A, with its enlarged bottom $b$, the centrally-located removable coffee-receptacle B, with its funnel-shaped perforated bottom or strainer $c$ and perforated tube C, and the spout D, having its upper portion connected, by the tube $g$, with the interior of the pot, at or near its top, all constructed to operate substantially in the manner and for the purpose set forth.

2. The ledge or flange $a$ on the interior of the pot, formed at the joint between its upper and lower portions by turning over to a horizontal position, as shown, the upper edge of the lower portion, $b$, in combination with the overlapping edge of the upper portion, $m$, and the coffee-receptacle B, substantially as and for the purpose described.

Witness my hand this 20th day of December, A. D. 1878.

GEO. F. HUSSEY.

In presence of—
P. E. TESCHEMACHER,
W. J. CAMBRIDGE.